(No Model.) 2 Sheets—Sheet 1.
L. W. TIFFANY.
TIME REGISTER.
No. 425,193. Patented Apr. 8, 1890.
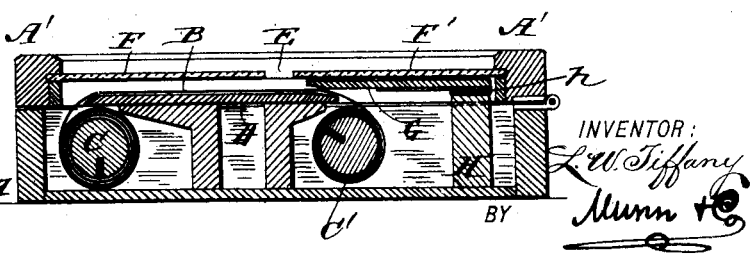

(No Model.) 2 Sheets—Sheet 2.
L. W. TIFFANY.
TIME REGISTER.
No. 425,193. Patented Apr. 8, 1890.
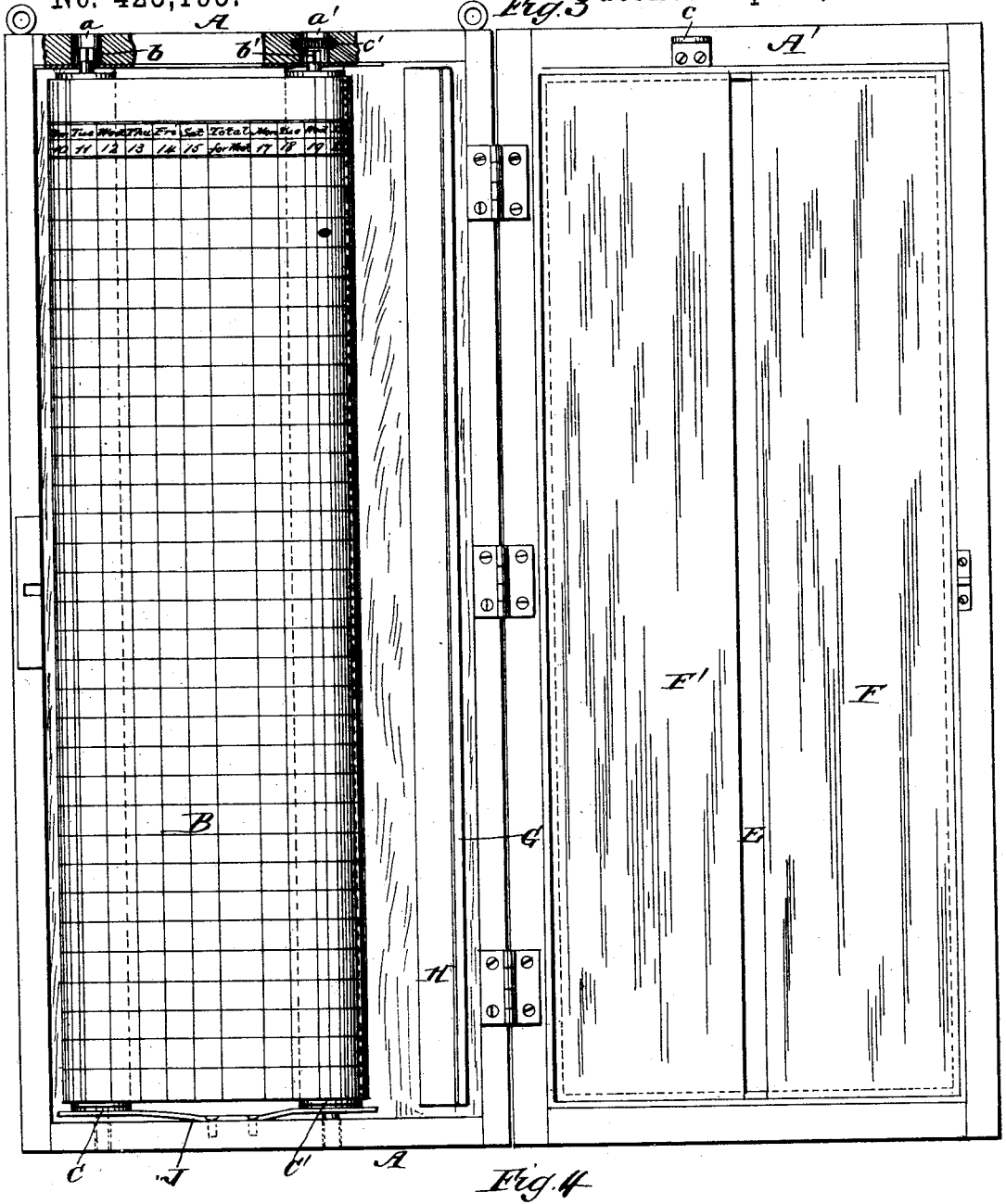
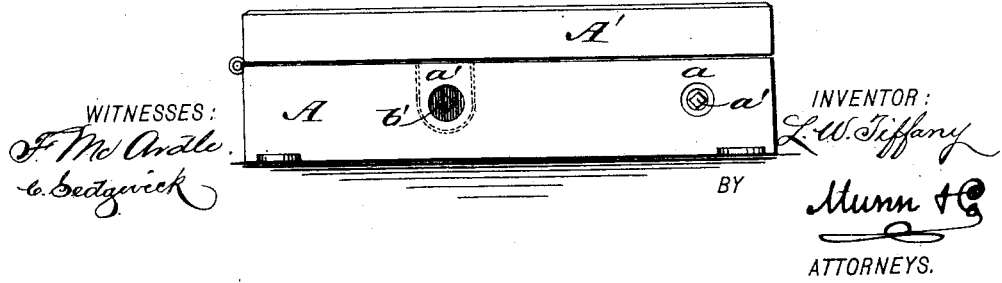
WITNESSES:
F. McArdle
C. Sedgwick
INVENTOR:
L. W. Tiffany
BY
Munn & Co.
ATTORNEYS.

UNITED STATES PATENT OFFICE.

LEVERETT W. TIFFANY, OF WINSTED, CONNECTICUT.

TIME-REGISTER.

SPECIFICATION forming part of Letters Patent No. 425,193, dated April 8, 1890.

Application filed September 18, 1889. Serial No. 324,306. (No model.)

*To all whom it may concern:*

Be it known that I, LEVERETT W. TIFFANY, of Winsted, in the county of Litchfield and State of Connecticut, have invented a new and Improved Time-Register, of which the following is a full, clear, and exact description.

My invention relates to a register designed for use in factories, mills, &c., or in any situation where employés are paid by the hour, to facilitate the keeping of correct daily account of each person's time of work; and the invention consists, principally, of a register constructed to inclose a time-sheet and to expose a portion thereof through an opening or slot through which each employé may mark his or her time. The time-sheet is by preference ruled for each day in the week and adapted to be shifted to bring the columns in line with the opening or slot.

The invention also consists in combining with the register at one side of the slot or opening a narrow slate on which the names of the operatives or employés may be written in a column parallel with the slot or opening through which the records are marked on the time-sheet.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a front elevation of my new time-register. Fig. 2 is a sectional plan view of the same on line $x\,x$ of Fig. 1. Fig. 3 is a broken front elevation with the door or front open, and Fig. 4 is an end view showing the key-holes in which a key is inserted for shifting the time-sheet.

A represents the main frame of the register, having a cover A' hinged to one side or edge thereof. Inclosed within the register is the time-sheet D, placed on the rollers C C', located one each side of the table D, over which the time-sheet is drawn, and which forms a support for the sheet, so that it may be readily marked upon with a pencil or pen through the opening or slot E in the cover A'. The said slot E is formed by the spaced plates F F', preferably of glass, fitted in the cover A', as shown clearly in Fig. 2. Beneath the plate F' is held a narrow slate G, on which the names of the employés are written, as indicated in Fig. 1. The said slate is by preference secured to a strip H by hinge $h$, so that it may be turned outward, as shown in Fig. 3, to expose the roll C' for attaching the time-sheet thereto. When the slate G is placed beneath the plate F', as in this instance, the said plate must be of glass; but in some cases the slate might take the place of the said plate, but in this event there would be no protection for the names written on the slate, as in the construction here shown.

The rollers C C' are adapted to be turned for shifting the time-sheet by a key inserted at holes $a\,a'$ and applied to the arbors $b\,b'$, and to prevent the rollers from turning back of their own accord I journal them in the spring-plate J, which lifts the rollers against the top of the main frame and acts as a brake.

To prevent the time-sheet from being turned back except by the person having a key to the cover A', I attach to the cover a plate $c$, adapted to enter a slot $c'$ in the main frame when the cover is closed, so as to cover the arbor $b'$ and wholly prevent a key from being applied thereto.

The use of the register is obvious. The name of each employé is written on the slate, and each day opposite his name will be marked the number of hours employed. The time-sheet will be shifted for each day.

Having thus fully described my invention, I claim as new and desire to secure by Letters Patent—

1. A register constructed to inclose a time-sheet and formed with an elevated support for the sheet and provided with a tablet for the list of names, combined with a slotted cover, substantially as described.

2. A register constructed to inclose a time-sheet and a tablet for the list of names, combined with a transparent cover formed with a narrow slot, substantially as described.

3. The rollers journaled in the frame and a time-sheet placed on said rollers, and an elevated support between the said rollers, in combination with a hinged tablet and a cover provided with spaced transparent plates forming a slot, substantially as described.

LEVERETT W. TIFFANY.

Witnesses:
 CHARLES WELDON,
 SAMUEL A. HERMAN.